(12) United States Patent
Gross et al.

(10) Patent No.: US 10,151,361 B2
(45) Date of Patent: Dec. 11, 2018

(54) CENTRIFUGAL BRAKE MECHANISM

(71) Applicant: SKYSAVER RESCUE LTD., Jerusalem (IL)

(72) Inventors: Eliezer Baruch Gross, Petah Tikva (IL); Avner Farkash, Yakir (IL); Daniel Israel Minehart, Beitar Illit (IL); Sasson Betzalel, Jerusalem (IL)

(73) Assignee: SKYSAVER RESCUE LTD., Jerusalem (IL)

( * ) Notice: Subject to any disclaimer, the term of this patent is extended or adjusted under 35 U.S.C. 154(b) by 0 days.

(21) Appl. No.: 15/516,724

(22) PCT Filed: Oct. 7, 2015

(86) PCT No.: PCT/IL2015/050998
§ 371 (c)(1),
(2) Date: Apr. 4, 2017

(87) PCT Pub. No.: WO2016/056005
PCT Pub. Date: Apr. 14, 2016

(65) Prior Publication Data
US 2017/0307031 A1 Oct. 26, 2017

(30) Foreign Application Priority Data
Oct. 7, 2014 (IL) .......................... 235049

(51) Int. Cl.
*F16D 49/20* (2006.01)
*F16D 51/10* (2006.01)
(Continued)

(52) U.S. Cl.
CPC ................ *F16D 49/20* (2013.01); *E06C 7/18* (2013.01); *F16D 49/16* (2013.01); *F16D 49/22* (2013.01); *F16D 51/10* (2013.01)

(58) Field of Classification Search
CPC .......... F16D 49/16; F16D 49/20; F16D 49/22; F16D 51/10; F16D 51/12; F16D 65/10
See application file for complete search history.

(56) References Cited

U.S. PATENT DOCUMENTS 1,773,120 A * 8/1930 Richter ................... F16D 51/12
188/250 G
2,205,026 A 5/1939 Barham
(Continued)

FOREIGN PATENT DOCUMENTS

DE 202006018549 U1 5/2007
EP 0039074 A2 11/1981
(Continued)

OTHER PUBLICATIONS

International Search Report for International Application No. PCT/IL2015/050988 dated Apr. 22, 2016.

*Primary Examiner* — Huan Le
(74) *Attorney, Agent, or Firm* — Dorsey & Whitney LLP (57) ABSTRACT

A centrifugal brake mechanism for a controlled descent device, and a drum device employing it, are described. The mechanism comprises a circular wheel configured and operable to rotate about an axis of rotation thereof, an axle extending along and rotatable about the axis inside a central cavity of the wheel and having two or more parallel shaft rods extending inside the cavity substantially perpendicular to the axis of rotation, a gear system for transferring rotations of the wheel into counter-rotations of the axle, one or more brake elements each having pass-through bores for slidably mounting over the two or more parallel shaft rods, springs mounted over the parallel shaft rods between the brake element and the axle, and a friction enhancement mechanism for increasing friction forces between the brake (Continued)

elements and the inner wall the wheel responsive to increase in angular velocity of the wheel.

20 Claims, 7 Drawing Sheets

(51) Int. Cl.
*F16D 49/16* (2006.01)
*F16D 49/22* (2006.01)
*E06C 7/18* (2006.01)

(56) References Cited

U.S. PATENT DOCUMENTS

| | | | |
|---|---|---|---|
| 3,760,901 A | 9/1973 | Hynes | |
| 3,946,989 A | 3/1976 | Tsuda | |
| 4,063,615 A | 12/1977 | Knepp | |
| 4,602,699 A | 7/1986 | Matt | |
| 4,949,812 A | 8/1990 | Arthur et al. | |
| 4,986,390 A | 1/1991 | Kikuchi | |
| 6,966,407 B2 | 11/2005 | Karnes et al. | |
| 9,474,918 B2 * | 10/2016 | Larsson | A62B 1/10 |
| 2004/0065508 A1 | 4/2004 | Avots et al. | |
| 2004/0245048 A1 | 12/2004 | Ribic | |
| 2006/0163000 A1 | 7/2006 | Chowthi | |
| 2007/0001048 A1 | 1/2007 | Wooster et al. | |
| 2008/0296011 A1 | 12/2008 | Hult | |
| 2009/0173578 A1 | 7/2009 | Renton et al. | |
| 2010/0122874 A1 | 5/2010 | Harris, Jr. | |
| 2010/0181145 A1 | 7/2010 | Hobson | |
| 2010/0224448 A1 | 9/2010 | Wolner et al. | |
| 2013/0248291 A1 | 9/2013 | Jones et al. | |
| 2014/0021421 A1 | 1/2014 | Torben | |

FOREIGN PATENT DOCUMENTS

| | | |
|---|---|---|
| WO | 1989/000063 A1 | 1/1989 |
| WO | 2003/055560 A1 | 7/2003 |
| WO | 2006066417 A1 | 6/2006 |

* cited by examiner

CENTRIFUGAL BRAKE MECHANISM

TECHNOLOGICAL FIELD

The present invention is generally in the field of centrifugal brakes usable for controlled descent devices.

BACKGROUND

In today's urban environments, many people live or work in multi-storied buildings such as sky-scrapers. In case of a fire or terrorist attack, rapid descent from upper floors of such buildings may be necessary. In such emergency situations, use of an elevator may be unsafe. Emergency stairwells may become blocked by fire or smoke, making rapid escape difficult. Descent devices may be used in such emergency situations to allow a rescuee to be safely lowered to the ground.

Some patent publications relating to brake mechanisms usable for controlled descent device (CDD) applications are briefly described below.

US Patent publication No. 2010/181145 describes a descent device comprising a hollow spool rotatable about a rotational axis and a lifeline, in the form of a braided steel cable, wound about the spool. A centrifugal brake mechanism including a brake assembly, comprising a pair of brake shoes and associated brake pads, is engageable with the spool to apply a braking force to the spool as the spool rotates. Biasing members, in the form of compression springs, extend between the brake shoes for biasing the brake shoes and pads into engagement with the spool.

US Patent publication No. 2004/245048 describes a rappelling device for permitting persons to be rescued from high buildings, towers, and the like, having a suspension strap, suspension vest, or the like, to be worn by the person in question, wherein a rope container having a device to release the rope length is provided on the suspension strap, which solution is supposed to be easy to operate, on the one hand, and to be made available to the persons in question at any time, and easy to handle for them, whereby the person using the device can essentially move both hands freely, in a stable rappelling position. This is achieved in that the rope drum that forms the rope container, in the wearing position on the back of the person using the device, is provided with a rope guide device for passing the rope to a release position in the chest region of the person using the device.

International Patent Publication No. WO 03/055560 discloses an abseiling device used as rescue equipment in disaster situations, particularly fires in buildings or tall buildings, comprising a harness for supporting particularly a person, a housing provided with a rope drum and an automatic braking device, and a rope, one end of which is fixed to the building and the other end of which is fixed to the housing. The housing is connected to the harness so as to form a unit.

International Patent Publication No. WO 89/00063 describes a lowering device particularly for assisting persons to escape from multi-storied buildings in an emergency situation, and adapted to engage a cable or rope of twisted configuration. The device comprises an inner rotatable sleeve surrounding and engaging the cable to follow the twist therein and rotate about the cable as it descends down the cable. The inner sleeve is contained within an outer housing which, in turn, supports a person, and the speed of rotation of the inner sleeve and thus the rate of descent of the device down the cable is controlled by a centrifugal brake having bell cranks carried by the inner sleeve and each pivotable against tension springs under centrifugal force to cause eccentrics on the ends of the cranks to act on brake shoes which engage a brake surface on part of the outer housing. Also disclosed is a device which, as an alternative, involves braking by utilizing a hydraulic system with a closed circuit gear pump driven by the inner sleeve and containing a variable constricted orifice to control the speed of the pump and therefore the rate of descent of the device.

The slow descender described in U.S. Pat. No. 3,946,989 includes a rope pulley and a braking apparatus which restricts the rotation speed of the rope pulley. The braking apparatus includes a mechanical braking device containing a centrifugal brake which has centrifugal weights, a V-shaped lining part cooperating with the weights, and a speed multiplying gearing device connecting the rope pulley and the centrifugal friction brake. The slow descender further includes an oil hydraulic braking device of the vane pump type or of the inscribed gear pump type.

U.S. Pat. No. 4,986,390 describes a small and light slow-descending device that anybody can easily carry in a traveling bag, or the like. Therefore, it is useful as an emergency evacuation device which enables to escape from a fire in a hotel, apartment house, office building, etc., or from a disaster in a high level road or highway, etc.

GENERAL DESCRIPTION

There is a need in the art for compact and efficient centrifugal brake mechanisms for a controlled descent device configured to be attached to a harness wearable by a descending user and capable of rapidly damping angular velocity of a rotating body (e.g., a wheel, drum, or cable reel) of the device. Embodiments of the centrifugal brake mechanism of the present invention are particularly beneficial for drum devices of controlled descent devices (CDDs) configured to regulate the speed release of a cable spooled in the drum device, and guarantee continuous cable release from the device until reaching safe ground, and prevent suspension trauma. For this purpose a friction enhancement mechanism is used in some embodiments for increasing friction forces in response to increase in angular velocity of the cable drum.

The centrifugal brake mechanism of the present invention is configured to allow substantial reduction of the geometrical dimensions of the drum device by compactly arranging its components inside a circular central cavity formed inside a cable reel/drum, of the drum device, on which the cable is spooled. Brake elements (e.g., brake shoe arrangements) mounted inside the central cavity are slidably coupled to a rotatable axle/shaft coaxially mounted inside the cable reel, and a planetary gear system is used to transfer rotations of the cable reel into counter-rotations of the axle. This configuration causes the brake elements to rotate inside the central cavity in a direction opposite to the direction of the rotation of the cable reel, and responsively to radially slide outwardly towards an inner wall of the cable drum due to centrifugal forces applied over them, and exert friction forces which slow down the angular speed of the cable drum.

In some embodiments the brake elements are mounted inside the cavity for radial movement over two or more parallel shaft rods attached to the axle. As the brake elements slide over the shaft rods distally away from the axle their front faces become pressed against the inner wall of the cavity and apply friction forces thereover, thereby damping the angular velocity of the cable drum and consequently slowing down the descent speed.

In some embodiments the brake mechanism comprises a friction enhancement mechanism configured to damp the angular speed of the drum by increasing the contact surface area of the braking elements used to apply the friction forces. The friction enhancement mechanism is preferably configured to provide engagement between one or more circular rails and corresponding one or more curved grooves engageable with said one or more circular rails, provided on the brake elements and on the inner wall of the cable drum. In this way, the friction forces evolving between the brake elements and the inner wall of the wheel are progressively increased responsive to increase in angular velocity of the wheel. Particularly, in addition to the friction obtained between the front faces of the brake elements and the inner wall of the cable drum, as the angular speed of the cable drum is increased, the circular rails progressively become engaged in the curved grooves, which adds to the friction forces a progressively increasing friction component.

The one or more curved grooves may be provided on the front faces of the brake elements and/or on the inner wall of the cable drum, and one or more corresponding circular rails may be provided on the inner wall of the cable drum and/or on the front faces of the brake elements. For example, in some embodiments the front faces of the brake elements comprise one or more curved grooves and the inner wall of the cable drum comprises one or more circular rails radially protruding inwardly from the inner wall of the cavity, each circular rail configured to become engaged inside curved grooves of the brake elements, while the respective brake elements contact the inner wall.

In one aspect there is provided a centrifugal brake mechanism for a controlled descent device and being configured to be attached to a harness wearable by a descending user. The centrifugal brake mechanism comprises a support structure configured for attachment to the harness, a circular wheel having a circular central cavity and being attached to the support structure to allow it to be rotated about an axis of rotation of the wheel, an axle mounted inside the central cavity and configured and operable to rotate about the axis of the wheel thereinside and comprising two or more parallel shaft rods attached thereto and extending substantially perpendicular to the axis of rotation, a gear system configured and operable to transfer rotations of the wheel into counter-rotations of the axle, one or more brake elements each having two or more pass-through bores for slidably mounting inside the central cavity over the two or more parallel shaft rods and configured to radially slide towards an inner wall of the wheel encircling the cavity in response to the counter-rotations of the axle and contact and apply friction forces over the inner wall by a front face thereof.

The centrifugal brake mechanism further comprises two or more springs mounted over at least one of the shaft rods between the brake element and the axle. A friction enhancement mechanism is used in some embodiments for increasing friction forces responsive to increase in angular velocity of the wheel. The friction enhancement mechanism is configured for providing additional engagement between the circular wheel and the brake elements by one or more circular rails and corresponding one or more curved grooves engageable with said one or more rails. The friction enhancement mechanism is configured to progressively increase friction between the brake elements and the inner wall of the wheel responsive to increase in angular velocity of the wheel.

In some possible embodiments the friction enhancement mechanism is implemented by one or more curved grooves provided in the each brake element and one or more circular rails provided in the inner wall encircling the cavity. The circular rails are configured to be received inside one of the curved grooves when the brake elements contact the inner wall, to thereby increase the applied friction forces. The one or more curved grooves form in some embodiments shoulder structures in the outer faces of the brake elements, and each of the one or more circular rails can be formed by two circular grooves formed in the inner wall. In this way, each circular groove is configured to receive one of the shoulder structures of the brake elements when the brake elements contact the inner wall, to thereby increase the applied friction forces.

Geometrical shapes of at least one of the curved grooves and of a respective one of the circular rails configured to be received in it, may be adapted to progressively increase the contact surface area of the respective brake element according to the speed of rotation of the wheel, to thereby increase the friction forces responsive to increase in angular velocity of the wheel. Additionally or alternatively, one of the one or more curved grooves may comprise a tapering groove section in which opposing sides of the groove taper towards the axis of rotation, and at least one of the one or more circular rails may comprise a corresponding tapering rail section configured to be received inside the tapering groove section.

Optionally, and in some embodiments preferably, the gear system is a planetary gear comprising a sun-gear fixedly attached to the axle, one or more planet gears attached to said support member and meshing with the sun-gear, and a ring-gear formed over a portion of the inner wall of the cavity and meshing with said one or more planet gears. In some embodiments, the gear system is configured to rotate the axle during rotation of the wheel in an angular velocity whose magnitude is greater than the magnitude of the angular velocity the wheel. For example, and without being limiting, a speed ratio of the gear system may be about 1 to 5.3.

In another aspect there is provided a drum device for controlled release of a cable spooled therein and anchored to an external support by a free end thereof, and being configured to be harnessed to a descending user for guaranteeing continuous descent of the user while preventing suspension trauma. The drum device comprising a housing having a cable release opening for passage of released cable portions therethrough, and the centrifugal brake mechanism as described hereinabove or hereinbelow. For example, the drum device comprises a cable reel on which the cable is spooled, and the cable reel is mounted inside the housing for rotation about an axis thereof during the release of the cable through the opening, an axle mounted inside a central cavity of the cable reel and configured to rotate thereinside about the axis of the wheel, a gear system configured and operable to transfer rotations of said cable reel into counter-rotations of said axle, and one or more brake elements slidably coupled to the axle inside the central cavity and configured and operable to radially slide towards an inner wall of the cable reel encircling the cavity in response to the counter-rotations of the axle, and to contact and apply friction forces over the inner wall.

The brake elements and inner wall of the wheel are adapted in some embodiments to implement a friction enhancement mechanism implemented by one or more curved grooves and corresponding one or more circular rails, as described hereinabove and hereinbelow. Similarly, geometrical shapes of at least one of the curved grooves and of a respective one of the circular rails may be adapted to progressively increase the contact surface area of the respective brake element according to the speed of rotation of the wheel, to increase the friction forces responsive to increase in angular velocity of the wheel. At least one of the one or more curved grooves may comprise a tapering groove section, and at least one of the one or more circular rails may comprise a corresponding tapering rail section, as described hereinabove and hereinbelow.

The drum device may comprise one or more shaft rods attached to the axle substantially perpendicular to the axis of rotation, and each brake element may comprise one or more pass-through bores for slidably mounting it over the shaft rods for it to radial slide thereover. One or more return springs, each spring being mounted over one of said one or more shaft rods, may be used to mechanically couple between the axle and the brake element mounted over the shaft rod.

In some embodiments a cable-release system is used to receive released cable portions from the circular wheel and direct the released cable portions in an outward direction towards the cable release opening of the drum device, and prevent backward movement of the released cable into the housing. For example, and without being limiting, the cable-release system may comprise a first cable-release unit mounted above the cable reel and having a slender opening defined between two rotatable roller shafts for passage of the released cable portions therethrough. Optionally, and in some embodiments preferably, the two rotatable roller shafts of the first cable-release unit are set with substantially different diameters according to a predetermined bend radius of the cable.

The cable-release system may comprise at least one additional cable-release unit having a slender opening defined between two rotatable roller shafts for passage of the released cable portions therethrough, where the at least one additional cable-release unit is mounted above and substantially in parallel to the first cable-release unit. Optionally, and in some embodiments preferably, orientation of the two rotatable roller shafts of the first cable-release unit is substantially perpendicular to orientation of the two rotatable roller shafts of the at least one additional cable-release unit.

In yet another aspect there is provided a controlled descent device comprising a wearable harness, a support structure attached to the harness and comprising a cable release opening for passage of portions of a spooled cable therethrough, and a drum device comprising the spooled cable and a brake mechanism configured to regulate the speed release of the cable from the drum device. In some embodiments the brake mechanism comprises a circular wheel configured to rotate about an axis of rotation thereof and having a circular central cavity, an axle extending along and rotatable about said axis of rotation inside the central cavity, two or more parallel shaft rods attached to the axle and extending substantially perpendicular to the axis of rotation inside the cavity, a gear system configured to transfer rotations of said wheel into counter-rotations of said axle, and one or more brake elements mounted on said two or more parallel shaft rods.

Optionally, and in some embodiments preferably, each brake element has two or more pass-through bores for slidably moving along the two or more parallel shaft rods inside said central cavity. Two or more springs are mounted over at least one of the shaft rods between the brake element and the axle, and the one or more brake elements are configured to radially slide over the parallel shaft rods towards the inner wall of the wheel encircling in response to counter-rotations of said axle.

The controlled descent device comprises in some embodiments a friction enhancement mechanism configured to increase friction forces between the brake elements and the inner wall of the wheel responsive to increase in angular velocity of the wheel. The friction enhancement mechanism is configured to provide additional engagement between the circular wheel and the brake element using one or more circular rails and corresponding one or more curved grooves engageable with the one or more rails, to thereby progressively increase friction between the brake elements and the inner wall of the wheel responsive to increase in angular velocity of the wheel. Thus, the friction enhancement mechanism further substantially facilitates prevention of suspension trauma to a descending user harnessed to the controlled descent device.

In some applications the controlled descent device comprises a cable-release system configured to receive released cable portions from the circular wheel and direct the released cable portions in an outward direction towards the cable release opening of the drum device, and prevent backward movement of the released cable into the housing. Optionally, and in some embodiments preferably, the cable-release system comprises first and second cable-release units mounted in parallel above the circular wheel, each cable-release unit having a slender opening defined between two rotatable roller shafts thereof for passage of the released cable portions therethrough. Optionally, the orientation of the rotatable roller shafts of the first cable-release unit is substantially perpendicular to orientation of the rotatable roller shafts of the second cable-release unit.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIGS. 10A and 10B show another possible embodiment of the drum device, wherein

DETAILED DESCRIPTION OF EMBODIMENTS

The various embodiments of the present invention are described below with reference to the drawings, which are to be considered in all aspects as illustrative only and not restrictive in any manner. Elements illustrated in the drawings are not necessarily to scale, emphasis instead being placed upon clearly illustrating the principles of the invention. This invention may be provided in other specific forms and embodiments without departing from the essential characteristics described herein.

Figure 1:
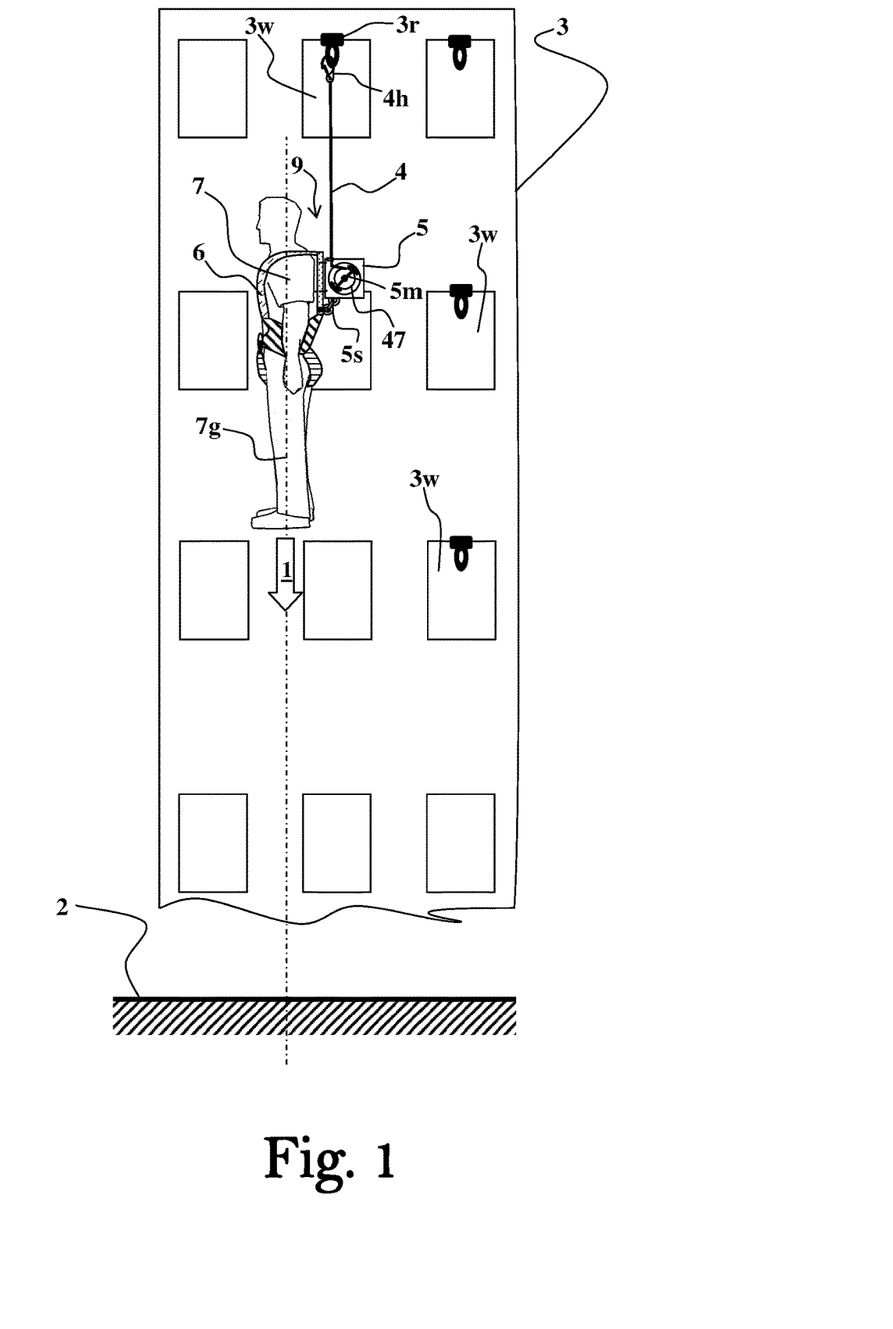
FIG. 1 exemplifies use of a CDD by a rescuee descending from a multi-storied building according to some possible embodiments.

FIG. 1 exemplifies use of a CDD 9 according to some possible embodiments. In this non-limiting example, a rescuee 7 escaping a high structure 3 (e.g., building) safely descends from the structure by controlled release of a cable 4 spooled in the CDD 9. The CDD 9 comprises a harness 6 (e.g., type of adjustable quick fit harness) worn by the rescuee 7, and a drum device 5 attached to the backside (back piece) of the harness 6, at the upper back area of the rescuee 7 (e.g., between the shoulder blades of the rescuee 7). The drum device 5 includes a spooled cable 4, a cable drum (also referred to herein as cable reel) 47 on which the cable 4 is spooled, and a centrifugal brake mechanism 5$m$ configured to regulate the rate of cable release from the drum device 5 and thereby guarantee safe descent of the rescuee 7 to the ground 2. The spooled cable 4 is attached at one end to the cable reel 47 and includes an anchor fastener 4$h$ (e.g., a snap hook) attached to its free end.

As shown in FIG. 1, in order to escape the structure 3 (e.g., in an emergency situation, such as spreading fire) the rescuee 7 wears the harness 6, secures the anchor fastener 4$h$ to an anchor member 3$r$, preferably an anchor fixture fixedly attached to the structure 3 (e.g., anchor ring), and exits the structure 3 e.g., through an opening 3$w$ such as a window, exit/escape door, or the like. After exiting the structure 3 the rescuee 7 is pulled downwardly by gravity (shown by arrow 1) towards the ground 2 and the spooled cable 4 is progressively released from the drum device 5 as the rescuee 7 descends downwardly towards the ground 2. In this non-limiting example the harness 6 and drum device 5 arrangement guarantees that orientation of the body of the rescuee 7 during the fall is substantially vertical relative to the ground 2. The brake mechanism 5$m$ provided in the drum device 5 is configured to controllably release the spooled cable 4 within predefined release speed rates and thereby maintain a substantially controlled descent speed (e.g., of about 0.7 to 2 m/sec for a rescuee weight between 30 to 135 Kg) of the rescuee 7, until safely reaching the ground 2.

The CDD 9 shown in FIG. 1 exemplifies a possible embodiment wherein the drum device 5 is mounted substantially perpendicular to a back piece of the harness 6, such that the plane of rotation of the cable reel 47 substantially resides in (or parallel to) a median plane of the rescuee 7. It is however noted that other arrangements of the harness 6 and the drum device 5 are also possible, without departing from the scope and spirit of the present invention. For example, and without being limiting, in some possible embodiments the drum device 5 may be mounted substantially parallel to the back piece (i.e., such that the plane of rotation of the cable reel 47 is substantially parallel to a frontal plane of the rescuee 7) and/or over a lower back area of the harness (e.g., below the shoulder blades of the user). Alternatively, in some possible embodiments the drum device 5 is mounted over a frontal piece of the harness such that the rotation plane of the cable reel 47 is substantially parallel (or perpendicular) to a frontal plane of the rescuee 7.

Figure 2:
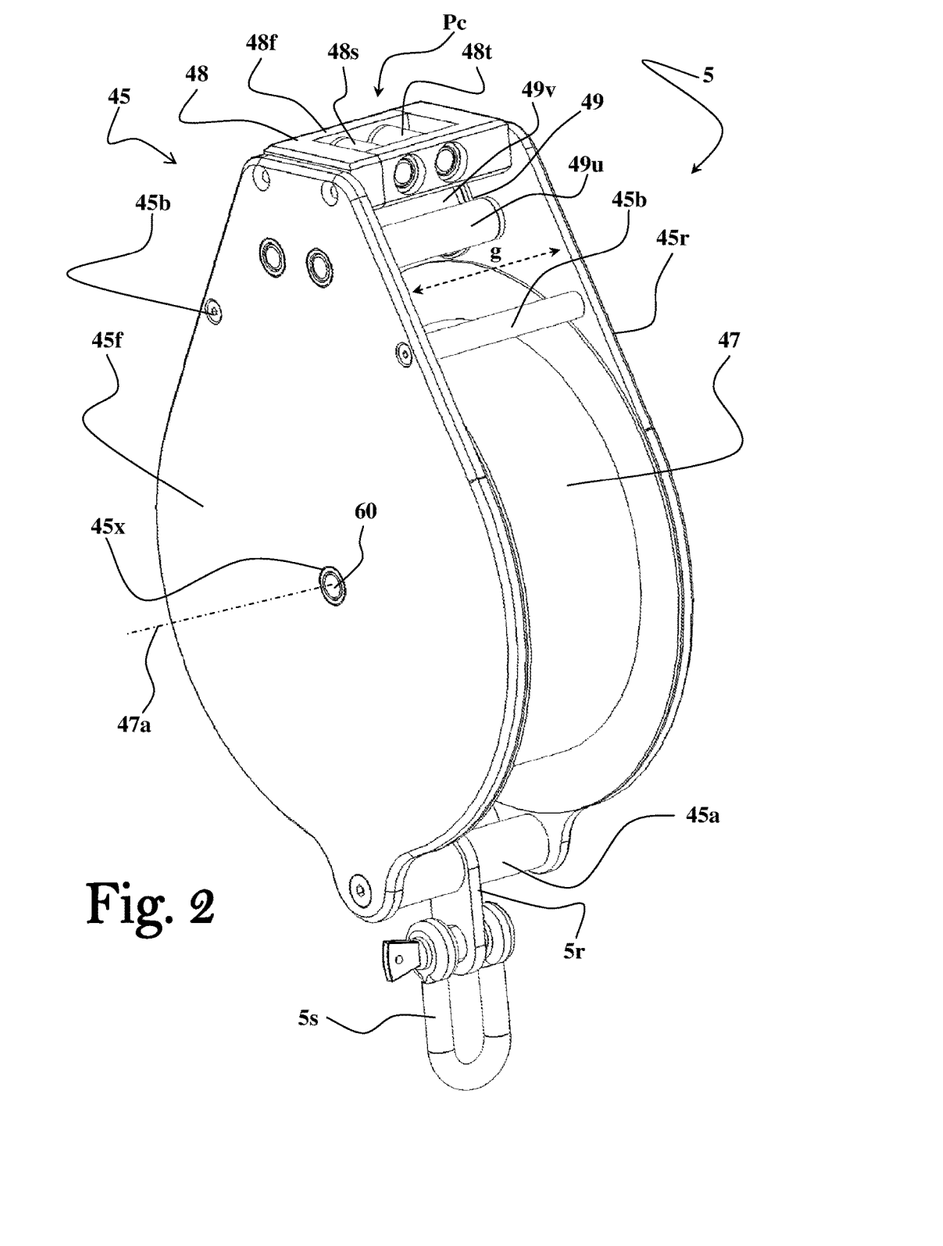
FIG. 2 shows a perspective view of a drum device of the CDD according to some possible embodiments.

FIG. 2 shows a perspective view of the drum device 5 according to some possible embodiments. In this non-limiting example the drum device 5 comprises a cable reel 47 mechanically coupled to an axle (shaft) 60 passing along the axis of rotation 47$a$ of the cable reel 47. The axle 60 is operably mounted for rotation inside a support structure 45 of the drum device 5. The support structure 45 comprises two tear-shaped side cover plates, 45$f$ and 45$r$, and upper and lower support elements (e.g., rods), 45$b$ and 45$a$, respectively, fixedly attached at their ends to the cover plates, 45$f$ and 45$r$. The length of the support elements, 45$b$ and 45$a$, is configured to define a gap g between the two side cover plates, 45$f$ and 45$r$, sufficiently wide to accommodate the cable reel 47 and permit free undisturbed rotations thereof inside the support structure 45. The extremities of the axle 60 are attached to the side cover plates 45$f$ and 45$r$ by bearings 45$x$ allowing it to freely rotate inside the support structure 45 in a plane of rotations being substantially parallel to the side cover plates.

The upper portion of the tear-like shaped support structure 45 includes a cable release mechanism for directing the release of the cable 4 from the drum device 5 and preventing backward movement of the cable 4 into the support structure. In this non-limiting example the cable release mechanism comprises two cable release units, 48 and 49, accommodated one on top of the other between the upper portions of the cover plates, 45$f$ and 45$r$. The cable release units 48 and/or 49 are configured and operable to direct the cable release in an outward direction towards a cable release opening Pc of the drum device 5, and prevent backward movement of the released cable 4 into the drum device 5. In this specific and non-limiting example the cable release opening Pc is defined by an opening of the upper cable release unit 48.

Figures 3, 4:
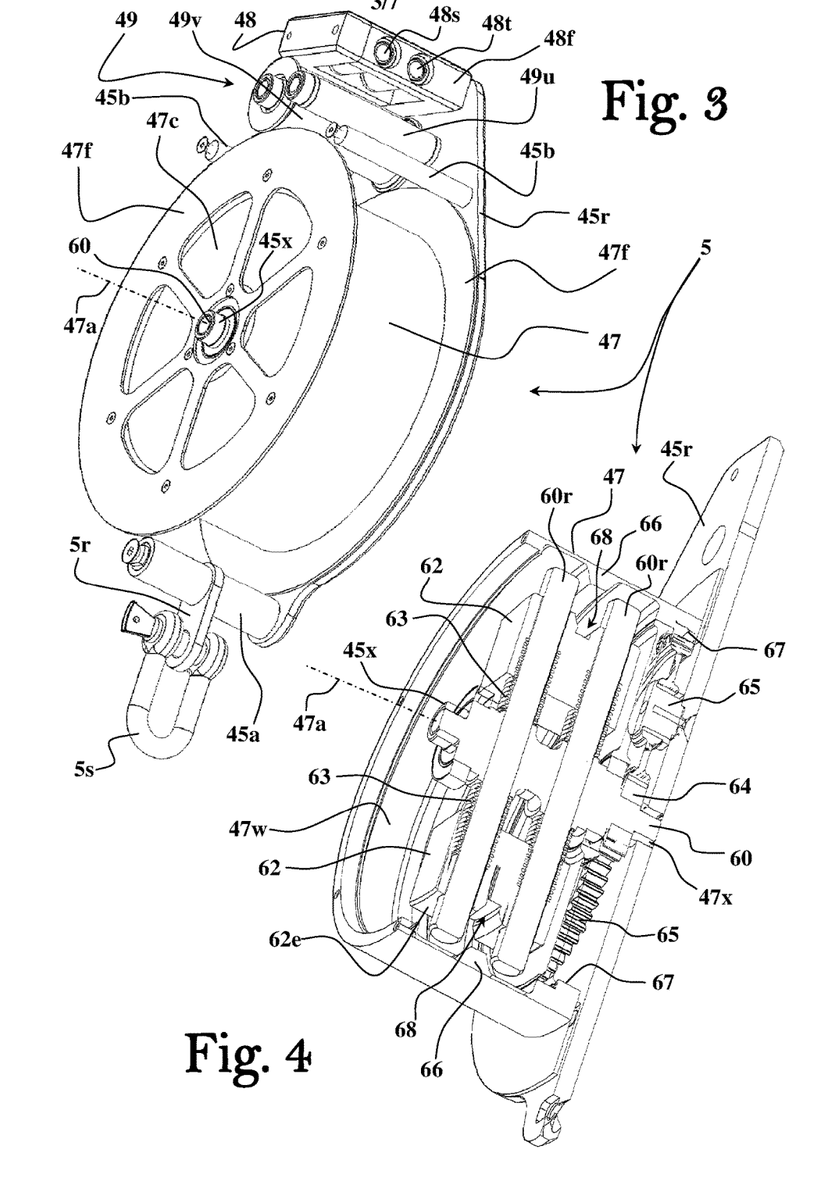
FIG. 3 shows a perspective view of the drum device without one of its covering plates.
FIG. 4 shows a sectional view of the drum device without its covering plate.

As best seen in FIG. 3, the bottom cable release mechanism 49 comprises two roller shafts rotatably mounted one parallel to the other between, and perpendicular, to the cover plates 45$f$ and 45$r$. As demonstrated in FIG. 3, in possible embodiments the two rollers shafts of the bottom cable release mechanism 49 are of different diameters and are configured to provide a desired bend radius. For example, and without being limiting, for a cable 4 having a diameter of about 3 mm and a bend diameter of about 32 mm, a first roller shaft 49$u$ of the bottom cable release mechanism 49 may be of a smaller diameter (e.g., about 16 mm) relative to a second roller shaft 49$v$ thereof having a greater diameter (e.g., about 32 mm). The parallel roller shafts 49$u$ and 49$v$ are mounted slightly spaced-apart above the cable reel 47, leaving a slender gap between them sufficient for passage of the cable 4 therethrough, while contacting the roller shafts and rotating them in predetermined directions due to friction forces evolving therebetween.

The parallel roller shafts, 49$u$ and 49$v$, may be configured to prevent movement of the cable (4) towards the cable reel 47 (i.e., to prevent the cable from returning back into the support structure 45), for example and without being limiting, by using a ratchet mechanism (not shown) configured to prevent rotation of the shaft rollers in a counter direction. Additionally or alternatively, backward movement of the cable 4 into the support structure may be prevented by properly setting the elasticity of the cable 4 to a desired suitable level for allowing cable deformations to occur when passing through the slender gap between the roller shafts and quick restoration of its shape upon leaving the roller shafts, and/or by applying adhesive material(s) between the cable 4 and the roller shafts of the cable release mechanism 49, and/or by setting friction of the surface of the rollers contacting the cable 4 to a desired suitable level.

The upper cable release mechanism 48 comprises two roller shafts 48s and 48t rotatably mounted one parallel to the other inside a flat frame 48f. In this specific and non-limiting example the roller shafts 48s and 48t of the upper cable release mechanism 48 have substantially the same diameter (e.g., about 16 mm). The frame 48f of the upper cable release mechanism 48 is mounted above the bottom cable release mechanism 49, between and perpendicular to the cover plates, 45f and 45r. The frame 48f is mounted inside the support structure 45 in a plane being substantially parallel to a plane in which the shaft rollers 49u and 49v, of the bottom cable release mechanism 49, reside.

As seen in FIG. 3, in this non-limiting example the axes of rotations of roller shafts 48s and 48t of the upper cable release mechanism 48 are substantially perpendicular to the axes of rotations of the shaft rollers 49u and 49v of the bottom cable release mechanism 49. The roller shafts 48s and 48t are mounted spaced-apart inside the frame 48f leaving a slender gap between them sufficient for passage of the cable (4) therethrough, while contacting the roller shafts and rotating them in predetermined directions due to friction forces evolving therebetween. The roller shafts, 48s and 48t, may be configured to prevent movement of the cable (4) towards the cable reel 47 (i.e., to prevent the cable from moving into the support structure 45), using one or more of the techniques described hereinabove with reference to the bottom cable release mechanism 49 (e.g., using a ratchet mechanism configured to prevent rotation of the shaft rollers in a counter direction).

In some embodiments a fastening element 5s (e.g., shackle), attached to the support structure 45, is used to fixedly attach the drum device 5 to the harness (6). The fastening element 5s may be attached to the support structure 45 by a fastening member 5r (e.g., metal ring or holed piece) suitable for attaching the fastening element 5s to the lower support element 45a, while permitting some rotary movement of the fastening element 5s thereabout.

FIG. 3 shows the drum device 5 without its side cover plate 45f, thereby exposing the arrangement of cable reel 47, and its reel flanges 47f, inside the support structure 45. FIG. 4 is a sectional view of the drum device, without the covering plate 45f and the reel flange 47f located beside it, thereby showing elements mounted inside the cable reel 47.

Figure 5A:
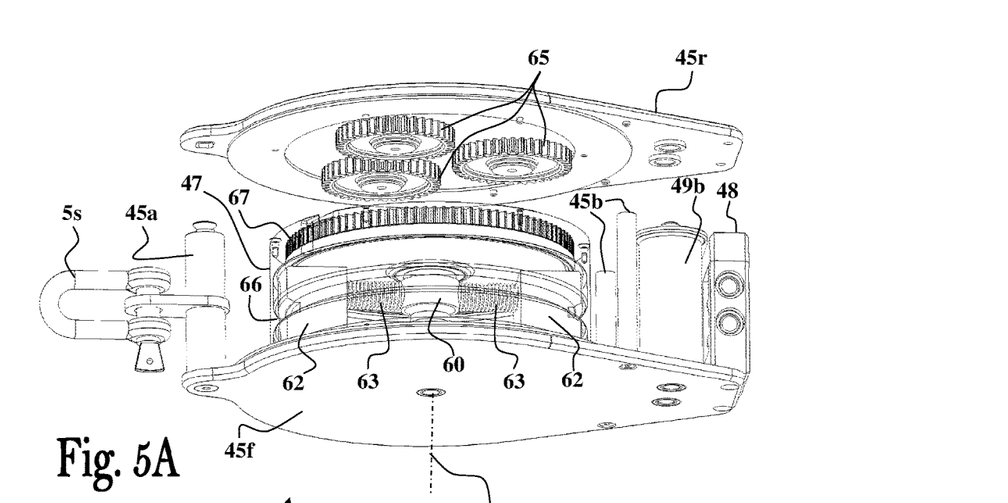
FIGS. 5A and 5B are exploded views showing internal components of the drum device from two different sides thereof.
Figure 5B:
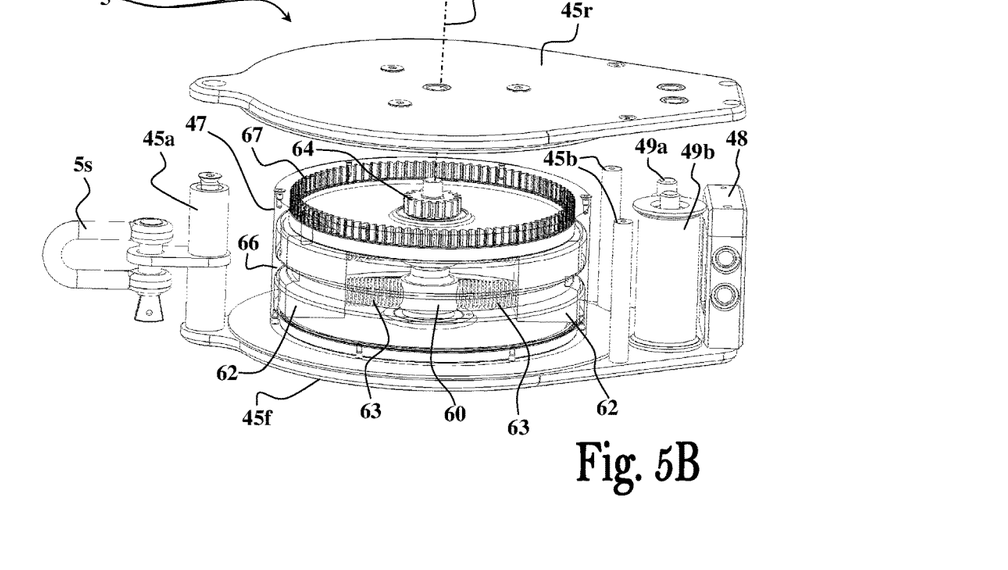

As best seen in FIGS. 5A and 5B, the axle 60 comprises a sun-gear 64 fixedly attached to it, the cover plate 45r comprises a planetary gear system 65 (e.g., comprising three planet-gear wheels) rotatably attached to it, and a ring-gear 67 is formed on a portion of the inner wall 47w of the cable reel 47 adjacent to the cover plate 45r. Each planet-gear 65, attached over the cover plate 45r free to rotate about its central axis, is mechanically coupled to the sun-gear 64 fixedly mounted on the axle 60, and to the ring-gear 67 formed on the inner wall 47w of the cable reel 47.

Optionally, and in some embodiments preferably, the planetary gear system 65 is designed to transfer the rotations of the cable reel 47 to the axle 60 during the cable release and cause counter rotations (i.e., in opposite direction) of the axle 60 in an angular velocity ($V_x$ in FIG. 6) that is greater than the angular velocity ($V_r$) of the cable reel 47. For example, in use, as the cable 4 is released from the drum device 5, the cable reel 47 rotates about the rotation axis 47a and the ring-gear 67 formed over the inner wall 47w of the cable reel 47 rotates the planet-gears 65 mechanically coupled to it in the same direction of rotations. In effect, the planet-gears 65 coupled to the sun-gear 64 rotate the axle 60 in a direction opposite to the direction of rotation of the cable reel 47.

Optionally, and in some embodiments preferably, the planetary gear system 65 may be configured and operable to rotate the axle 60 during the cable release and cause counter rotations (i.e., in opposite direction) of the axle 60 in an angular velocity ($V_x$ in FIG. 6) whose magnitude is greater than (or equal to) the magnitude of the angular velocity ($V_r$) of the cable reel 47. For example, and without being limiting, the planetary gear system 65 may be configured to provide a gear ratio of about 1 to 5.3.

In possible embodiments the diameter of the ring-gear 67 may be about 140 to 150 mm, the diameter of the planet-gears 65 may be about 50 to 70 mm, and the diameter of the sun-gear 64 may be about 25 to 35 mm. The axle 60, rod arms 67r, gear elements and cable reel 47, and other parts of the CDD 9, may be manufactured from any suitable metallic or plastic type of material capable of withstanding the forces evolving in the device during descent. For example, and without being limiting, in possible embodiments the brake shoes 62 may be manufactured from Iron, Aluminum, Brass, Stainless Steel, or combinations thereof, the cable reel 47 may be manufactured from Aluminum, plastic, fiberglass reinforced Nylon, or combinations thereof, and the cog-wheels of the gear system may be manufactured from any suitable metal or plastic material. The cable 4 may be made from a fireproof material, such as a metal, for example, from steel. Alternately, the cable 4 may be made of engineering plastics, such as Kevlar®, carbon fiber, or other high strength cable material. The length of the cable may be about 50-500 meters (m), and its diameter may be about 1 to 4 millimeters.

For example, and without being limiting, in some possible embodiments: the weight of a drum device, and about 50 m of cable reeled therein, may be about 5 kilograms; the weight of a drum device, and about 100 m of cable reeled therein, may be about 7.5 kilograms; and the weight of a drum device, and about 200 m of cable reeled therein, may be about 12 kilograms. The drum device having these weight ranges may be of suitable weight for a user to lift and put on his or her back using a CDD according to embodiments of the invention.

Figure 6:
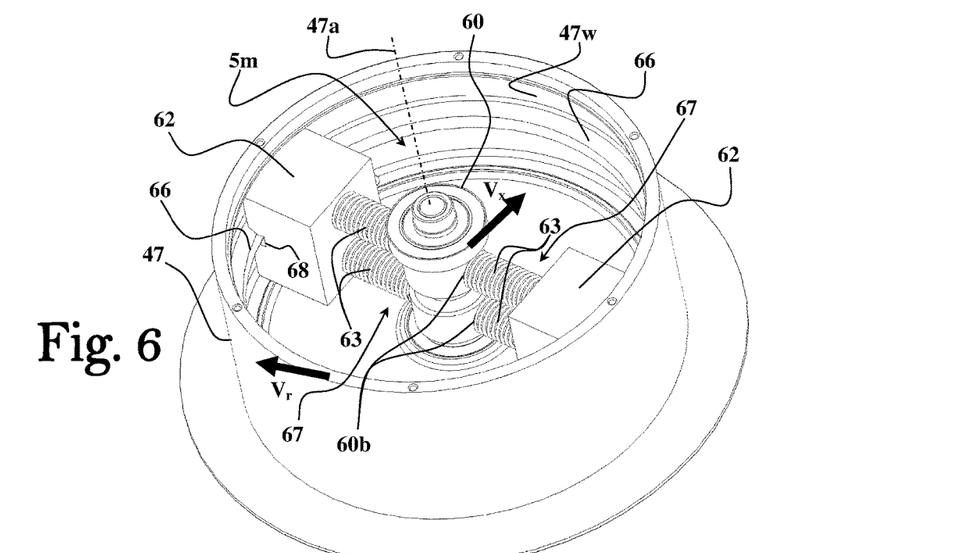
FIG. 6 shows an elevated perspective view of a cable reel of the drum device and internal components thereof mounted thereinside.

FIG. 6 is an elevated view of the cable reel 47 without the reel flange 47f showing components of the brake mechanism 5m operably mounted thereinside. It is seen that the axle 60 passing along the rotation axis 47a of the cable reel 47 comprises one or more pass-through bores 60b, and one or more rods 67 passing through the pass-through bores 60b fixedly attached to the axle 60. Each rod 67 attached to the axle 60 radially extends from the axle 60 and forms two rod arms (67r in FIGS. 7 and 8) extending outwardly from the axle 60 in opposite directions towards the inner wall 47w of the cable reel 47. One or more brake shoes 62 slidably mounted over the rod arms 67r are mechanically coupled to the axle 60 by return springs 63 and are configured to slide outwardly over the rod arms 60r, toward the inner wall 47w of the cable reel 47, due to centrifugal forces applied on them as the axle is rotated by the planetary-gear system 65. Accordingly, in this non-limiting example the brake system implements a "normally disengaged" mechanism, as the return springs retract the brake shoes 62 radially towards the axle 60 when centrifugal forces are not being applied.

In this specific and non-limiting example, two parallel rods 67 are attached to the axle 60 to form two pairs of rod arms 67r extending in opposite directions from the axle 60 towards the inner walls 47w of the cable reel 47. A brake shoe 62 is mounted over each pair of rod arms 67r and is configured to slide radially thereover towards the inner walls 47w of the cable reel 47 against pulling forces applied on the brake shoe by two return springs 63 mounted over the rod arms 67r. Optionally, and in some embodiments preferably, the springs 63 are placed over rod arms 67r without being attached to the brake shoes 62 or to the axle 60. In this way, the springs 63 are used as partitioning elements for preventing contact between the brake shoes 62 and the axle 60, and do not apply forces on the brake shoes 62 when they radially slide towards the inner walls 47w of the cable reel 47.

Figure 7:
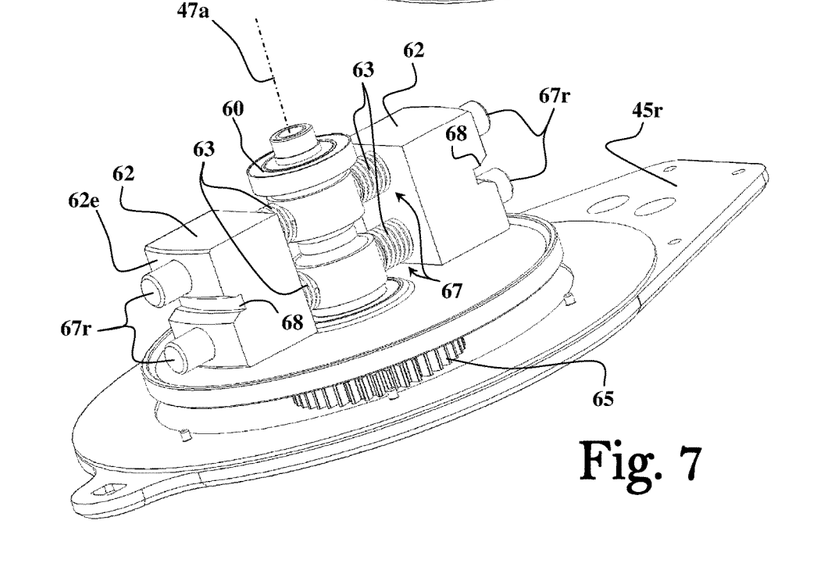
FIG. 7 shows a top perspective view of the drum device without one of its side cover plates and the cable reel.

FIG. 7 shows the centrifugal brake mechanism 5m in a rest state without the cable reel 47, wherein the brake shoes 62 and the return springs 63 are in a retracted position adjacent to the axle 60. When the spooled cable 4 is released from the drum device, the rotations of the cable reel 47 transferred to the planetary-gears 65 cause counter-rotations of the axle 60 and the rod arms 67r attached to it about the rotation axis 47a. The counter-rotations of the rod arms 67r apply centrifugal forces on the brake shoes 62 causing radial movement of the brake shoes 62 e.g., against return forces of the return springs 63, towards the inner wall 47w of the cable drum 47, until the brake shoes 62 contact the inner walls 47w of the cable reel 47.

As seen, the external faces (also referred to herein as front faces) 62e (i.e., facing the inner wall 47w) of the brake shoes 62 have a curved surface matching (i.e., being complementary to) the curvature of the inner walls of the cable reel 47, to thereby maximize the surface contact between them when the brake shoes 62 are pressed by the centrifugal forces against the inner walls 47w, and thereby maximize the friction forces between these surfaces. In this way, as the descent speed of the user 7 of the CDD 9 is increased during the fall, the counter-rotations of the rod arms 67r inside the cable reel 47 are also increased, thus increasing the centrifugal forces pressing the brake shoes 62 against the inner walls 47w of the cable reel 47. Consequently, the friction forces evolving between the external surfaces 62e of the brake shoes 62 and the inner walls 47w of the cable reel 47 are respectively increased, which in effect decreases the angular velocity of the cable reel 47. Correspondingly, decrease in the angular velocity of the cable reel 47 slows down the speed of cable release from the drum device, which in turn slows down the descent speed of the rescuee. Accordingly, properly setting the gear ratio of the planetary gear system 65 can be used to guarantee that the angular velocity of the cable reel 47 does not exceed a predefined limit (e.g., about 150 rpm), and thereby guarantee that the descent speed remains within a predetermined range (e.g., about 1 to 2 m/s).

In some possible embodiments the external surfaces 62e of the brake shoes 62 are covered by one or more friction enhancing layers (pads) configured to increase the friction coefficient of the brake shoes 62 and thereby increase the friction forces evolving between the brake shoes 62 and the inner walls 47w of the cable reel 47, so as to further slow down the speed of rotation of the cable reel 47 during descent. In other possible embodiments, the brake shoes 62 are configured to directly contact the inner wall 47w of the cable reel 47 i.e., without any friction enhancing layers.

Additionally, or alternatively, the brake mechanism 5m may comprise a friction enhancement (speed damping) mechanism configured to significantly increase the friction forces evolving between the brake shoes 62 and the inner wall 47w of the cable reel 47. For example, in some embodiments each brake shoe 62 comprises one or more curved (e.g., arc-shaped) grooves 68 (only one curved groove is shown in the figures) formed along its external face 62e i.e., facing the inner wall 47w of the cable reel 47, and being substantially parallel to the plane of rotation of the cable reel 47. The one or more curved grooves 68 are designed to receive and mate with one or more circular rails 66 inwardly protruding from the inner wall 47w of the cable reel 47 towards the axis of rotation 47a, and being substantially parallel to the plane of rotation of the cable reel 47. In this way, the contact surface areas of the brake shoes 62 and of the inner wall 47w of the cable reel 47 are substantially increased during engagement of the circular rails 66 in the curved grooves 68. Accordingly, as the brake shoes 62 are pushed outwardly against the inner wall 47w of the cable reel 47 by the centrifugal forces, greater friction forces evolve as the circular rails 66 progressively become engaged in the curved grooves 68, in addition to the friction forces obtained between the contacting surfaces of the front faces 62e of the brake shoes 62 and the inner wall 47w of the cable drum 47. In effect, a stronger rotation speed damping effect is achieved, which in turn effectively damps the descent speed of the CDD.

It is noted that the curved grooves 68 and their respective circular rails 66 further serve as guiding means that prevent movements of the brake shoes 62 in undesired directions during engagement of the rails 66 inside the grooves 68, and which translate rolling/tilting moments, which may be applied over the brake shoes during operation of the device, into an increase in the damping friction forces.

In some embodiments the damping friction forces are further increased by adding one or more inclined facets to the one or more curved grooves 68 and the one or more circular rails 66. For example, and without being limiting, at least one curved groove 68 may include a tapering section wherein the sides of the curved groove gradually taper towards the axis of rotation 47a, and a corresponding at least one circular rail 66 includes a corresponding tapering section configured to mate with the tapering section of the at least one curved groove 68.

In some embodiments (not shown) one or more circular rails are formed on the front faces 62e of the brake shoes 62, and one or more corresponding curved grooves are formed in the inner wall of the drum 47. Alternatively, in some possible embodiments, each brake element comprises one or more rails and one or more grooves, and the inner wall of the cable drum 47 comprises corresponding one or more grooves and one or more rails, configured to mate with therewith.

Figure 8:
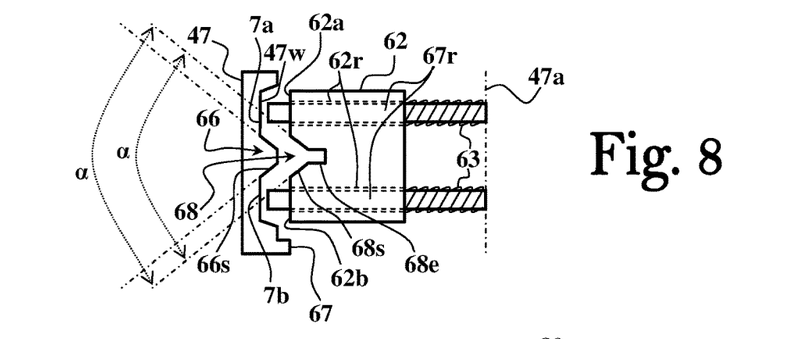
FIG. 8 shows a sectional side view of the inner wall of the cable reel and of a brake shoe according to some possible embodiments.

FIG. 8 shows a sectional side view of the wall of the cable reel 47 and of a brake shoe 62 according to some possible embodiments. In this non-limiting example the brake shoe 62 comprises two spaced apart and parallel pass-through bores 62r configured to receive two respective parallel rod arms 67r for slidable motion of the brake shoe 62 thereover. The return springs 63 mounted over the rod arms 67r are configured to retract the brake shoe 62 radially towards the axis of rotation 47a whenever the centrifugal forces acting on the brake shoe 62 are smaller than some predetermined level. The groove 68 may comprise a tapering portion 68s followed by a slit 68e, and the circular rail 66 protruding from the surface of the inner wall 47w may comprise a corresponding tapering structure 66s configured to be received inside the tapering portion 68s of the groove 68. The tapering portion 68s of the groove 68 and the tapering structure 66s of the circular rail 66 may have the same taper-angle $\alpha$ (e.g., about 30° to 90°). It is however noted that in possible embodiments the different (or slightly different) taper-angles may be used for the tapering portion 68*s* of the groove 68 and for the tapering structure 66*s* of the circular rail 66.

The slit portion 68*e* of the groove 68 may be configured to allow further advancement of the tapered rail 66 thereinto in response to increase in the centrifugal forces applied over the brake shoe 62. For example and without being limiting, layers of the external faces 62*e* of the brake shoe 62, and/or of the inner wall 47*w* of the cable reel 47, may be grinded during the descent, and in this event the apex of the tapered rail 66 may be further advanced into the slit portion 68*e* of the groove 68, thereby compensating for the grind layers by allowing expansion of the groove 68 and in effect increasing the friction between the brake shoe 62 and the inner wall 47*a*.

As also seen in FIG. 8, the circular rail 66 protruding from the inner wall 47*w* of the cable reel 47 forms two circular grooves, 7*a* and 7*b*, configured to receive respective shoulder structures, 62*a* and 62*b*, of the brake shoe 62. In this specific and non-limiting example the shoulder structures 62*a* and 62*b* are relatively symmetric and have a right-trapezoidal sectional shape.

Figure 9:
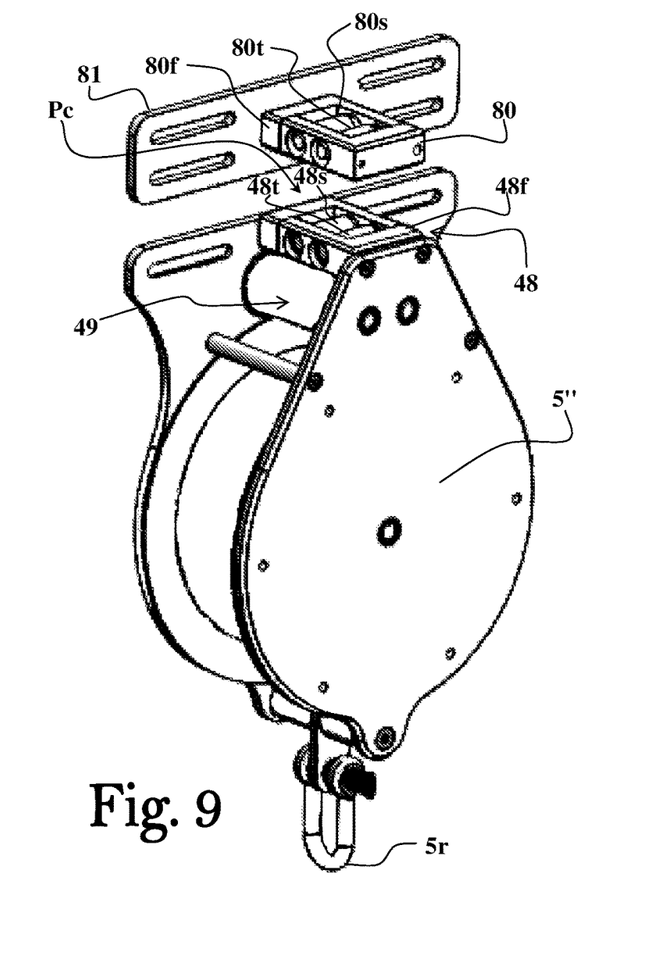
FIG. 9 shows a perspective view of a possible arrangement of the drum device according to some possible embodiments.

FIG. 9 shows a perspective view of a possible arrangement of a drum device 5" according to some possible embodiments. In this non-limiting example an additional cable release unit 80 is separately mounted above cable release opening Pc of the drum device 5". Particularly, the additional cable release unit 80 is mounted on a support member 81 and placed spaced-apart above the top cable release unit 48 of the drum device 5". As seen, the additional cable release unit 80 is substantially parallel to, and aligned with, the top cable release unit 48, and the orientation of its two rollers shafts, 80*s* and 80*t*, is substantially parallel to the orientation of the two rollers shafts 48*s* and 48*t* of the top cable release unit 48, to thereby guide the released cable 4 vertically/upwardly and prevent it from contacting the harness 6 and/or the rescuee 7. This arrangement of the roller shafts 48*s* and 48*t* being parallel to the back piece, also substantially prevents movement of the released cable towards the body of the rescuee.

For example, and without being limiting, the drum device arrangement shown in FIG. 9 may be used in a harness arrangement of a CDD. The drum device 5" may be secured to a back-piece of the harness (e.g., between the shoulder blades of the user), and the support member 81 may be mounted on the back-piece above the drum device 5" (e.g., above shoulder blades). In this configuration the additional cable release unit 80 is mounted on the separate support member 81, and it thus can move relative to drum device 5" and thereby facilitates in absorbing shocks and in distributing fall energy.

Figure 10A:
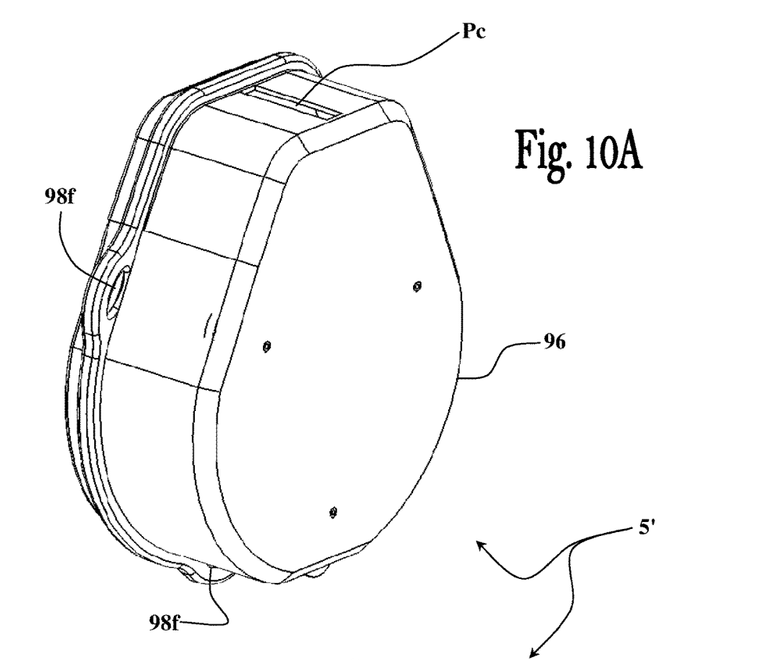
FIG. 10A is a perspective view of the drum device accommodated inside housing and FIG. 10B shows an exploded perspective view of the drum device without the housing.

FIG. 10A shows a possible embodiment of a drum device 5' mounted inside a housing 96. The housing 96 is configured to accommodate the drum device with the spooled cable 4, as exemplified in any one of the figures described hereinabove or hereinbelow. The housing 96 comprises a cable release opening Pc for passage of released cable portions therethrough and several fastening holes 98*f* provided at boundaries of a support plate 98 attached to the drum device 5'.

Figure 10B:
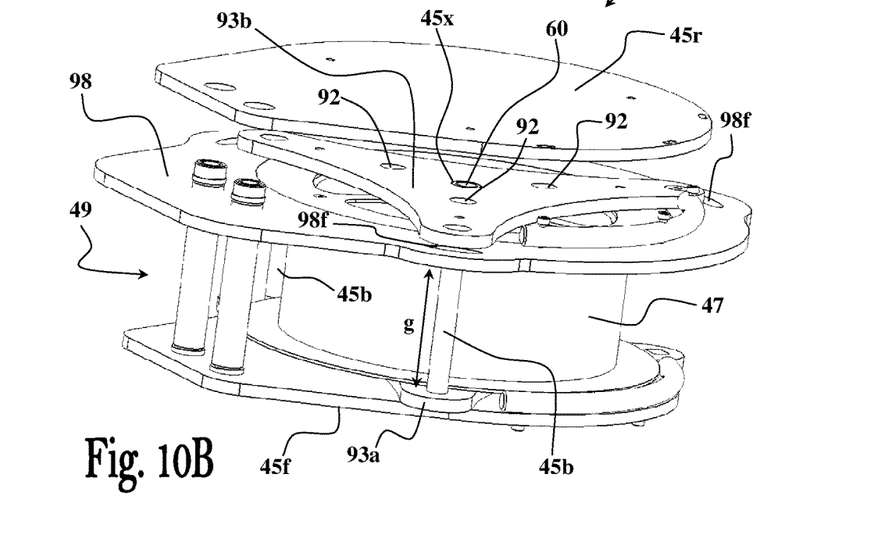

FIG. 10B shows an exploded perspective view of the drum device 5' without the housing 96 and with the cover plate 45*r* slightly elevated. As seen, in this non-limiting example one cable release unit 49 is used in the drum device 5', where the roller shafts of the cable release unit 49 are attached to the cover plates 45*f* and 45*r*, beneath the cable release opening Pc and substantially perpendicular to the cover plates. In this possible embodiment the cable reel 47 is mounted within a gap g defined between two three-apex star-shaped plates 93*a* and 93*b*, which are attached to each other by support elements (e.g., rods) 45*b* connecting between respective apex regions thereof, and the axle 60 is attached to the star-shaped plates 93*a* and 93*b* by bearings 45*x* for allowing it to rotate inside the drum cable reel about its axis of rotations.

The drum device 5' comprises a gear system (not shown) and brake elements (not shown) configured to regulate the cable release during the fall, as exemplified and described hereinabove. In this embodiment, however, each planet cogwheel is attached for rotation over a respective pivot 92 provided on one of the arms of the three-apex star-shaped plate 93*b*.

As described hereinabove and shown in the associated Figs., the present invention provides a centrifugal brake mechanism for a CDD. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the invention.

The invention claimed is:

1. A centrifugal brake mechanism for a controlled descent device, the centrifugal brake mechanism being configured to be attached to a harness wearable by a descending user, the centrifugal brake mechanism comprising:
   a support structure configured for attachment to the harness;
   a circular wheel located inside said support structure and configured and operable to rotate about an axis of rotation thereof, said circular wheel comprising a circular central cavity and an inner wall encircling the cavity;
   an axle mounted inside said central cavity, the axle extending along and rotatable about said axis of rotation inside said central cavity;
   two or more parallel shaft rods attached to the axle and extending substantially perpendicular to the axis of rotation inside the cavity;
   a gear system configured and operable to transfer rotations of said wheel into counter-rotations of said axle;
   one or more brake elements mounted on said two or more parallel shaft rods, each of the one or more brake elements having two or more pass-through bores for slidably moving along said two or more parallel shaft rods inside said central cavity, and two or more springs mounted over at least one of said shaft rods between the brake element and the axle, said one or more brake elements being configured and operable to radially slide over the two or more parallel shaft rods towards the inner wall of the wheel encircling said cavity in response to the counter-rotations of said axle; and
   a friction enhancement mechanism for increasing friction forces responsive to increase in angular velocity of the wheel, said friction enhancement mechanism being configured for providing additional engagement between the circular wheel and the brake element, said friction enhancement mechanism comprising one or more circular rails and corresponding one or more curved grooves engageable with said one or more rails, to thereby progressively increase friction between said one or more brake elements and the inner wall of the wheel responsive to increase in the angular velocity of the wheel.

2. The centrifugal brake mechanism of claim 1 wherein the one or more curved grooves form shoulder structures in outer faces of the one or more brake elements, and each of the one or more circular rails is formed by two circular grooves formed in the inner wall of the wheel, each of the two circular grooves being configured and operable to receive one of said shoulder structures of the one or more brake elements when said brake element contacts the inner wall of the wheel, to thereby increase the friction forces.

3. The centrifugal brake mechanism of claim 1 wherein geometrical shapes of at least one of the curved grooves and of a respective one of the one or more circular rails configured to be received in it, are adapted to progressively increase the friction forces responsive to increase in the angular velocity of the wheel.

4. The centrifugal brake mechanism of claim 3 wherein at least one of the one or more curved grooves comprises a tapering groove section in which opposing sides of the tapering groove taper towards the axis of rotation, and at least one of the one or more circular rails comprises a corresponding tapering rail section configured to be received inside said tapering groove section.

5. The centrifugal brake mechanism of claim 1 wherein the gear system includes a planetary gear system configured and operable to rotate the axle during rotation of the wheel in an angular velocity whose magnitude is greater than the magnitude of the angular velocity of the wheel.

6. The centrifugal brake mechanism of claim 5 wherein a speed ratio of the planetary gear system is about 1 to 5.3.

7. A drum device for controlled release of a cable spooled therein and anchored to an external support by a free end of said cable, said drum device is configured and operable to be harnessed to the descending user for guaranteeing continuous descent of the user while preventing suspension trauma, the drum device comprising the brake mechanism according to claim 1, and the support structure of the drum device has a cable release opening for passage of released cable portions therethrough.

8. The drum device of claim 7, further comprising a cable-release system configured and operable to receive released cable portions from the circular wheel and direct the released cable portions in an outward direction towards the cable release opening of the drum device, and prevent backward movement of the released cable into the housing.

9. The drum device of claim 8 wherein the cable-release system comprises a first cable-release unit mounted above the circular wheel and having a slender opening defined between two rotatable roller shafts thereof for passage of the released cable portions therethrough.

10. The drum device of claim 9 wherein diameters of the two rotatable roller shafts of the first cable-release unit are substantially different, and wherein the diameter of one of said rotatable roller shafts is set according to a predetermined bend radius of the cable.

11. The drum device of claim 9 wherein the cable-release system comprises at least one additional cable-release unit having a slender opening defined between two rotatable roller shafts for passage of the released cable portions therethrough, said at least one additional cable-release unit being mounted above and substantially in parallel to the first cable-release unit.

12. The drum device of claim 11 wherein an orientation of the two rotatable roller shafts of the first cable-release unit is substantially perpendicular to orientation of the two rotatable roller shafts of the at least one additional cable-release unit.

13. A controlled descent device, comprising:
a wearable harness;
a support structure attached to the harness and having a cable release opening for passage of portions of a spooled cable therethrough; and
a drum device comprising the spooled cable and a brake mechanism configured to regulate a speed of release of the cable from the drum device, said brake mechanism comprises:
a circular wheel configured to rotate about an axis of rotation thereof and comprising a circular central cavity and an inner wall encircling the cavity;
an axle extending along and rotatable about said axis of rotation inside said central cavity;
two or more parallel shaft rods attached to the axle and extending substantially perpendicular to the axis of rotation inside the cavity;
a gear system configured to transfer rotations of said wheel into counter-rotations of said axle;
one or more brake elements mounted on said two or more parallel shaft rods, each of the one or more brake elements having two or more pass-through bores for slidably moving along said two or more parallel shaft rods inside said central cavity, and two or more springs mounted over at least one of said two or more parallel shaft rods between the brake element and the axle, said one or more brake elements being configured and operable to radially slide over the parallel shaft rods towards the inner wall of the wheel encircling said cavity in response to the counter-rotations of said axle;
a friction enhancement mechanism for increasing friction forces responsive to increase in angular velocity of the wheel, said friction enhancement mechanism being configured for providing additional engagement between the circular wheel and the brake element and comprising one or more circular rails and corresponding one or more curved grooves engageable with said one or more rails, to thereby progressively increase friction between said one or more brake elements and the inner wall of the wheel responsive to increase in the angular velocity of the wheel.

14. The controlled descent device of claim 13, further comprising a cable-release system configured to receive released cable portions from the circular wheel and direct the released cable portions in an outward direction towards the cable release opening of the drum device, and prevent backward movement of the released cable into the support structure.

15. The controlled descent device of claim 14 wherein the cable-release system comprises first and second cable-release units mounted in parallel above the circular wheel, each of the first and second cable-release units having a slender opening defined between two rotatable roller shafts thereof for passage of the released cable portions therethrough.

16. The controlled descent device of claim 15 wherein an orientation of the rotatable roller shafts of the first cable-release unit is substantially perpendicular to orientation of the rotatable roller shafts of the second cable-release unit.

17. A drum device, comprising:
a support structure;

a circular wheel located inside said support structure and configured and operable to rotate about an axis of rotation thereof;

an axle mounted inside a cavity of the wheel, the axle extending along and rotatable about said axis of rotation;

two or more parallel shaft rods attached to the axle and extending substantially perpendicular to the axis of rotation;

spring element mounted over at least one of said shaft rods;

a gear system configured and operable to transfer rotations of said wheel into counter-rotations of said axle;

one or more brake elements mounted on said two or more parallel shaft rods, each brake element having two or more pass-through bores for sliding over said two or more parallel shaft rods towards an inner wall encircling the cavity of the wheel in response to the counter-rotations of said axle; and a friction enhancement mechanism for increasing friction forces responsive to increase in angular velocity of the wheel, said friction enhancement mechanism being configured for providing additional engagement between the circular wheel and the brake element, said friction enhancement mechanism comprising one or more circular rails and corresponding one or more curved grooves engageable with said one or more rails, to thereby progressively increase friction between said one or more brake elements and the inner wall of the wheel responsive to increase in the angular velocity of the wheel.

18. The drum device of claim 17 comprising a cable-release system configured and operable to receive released cable portions from the circular wheel and direct the released cable portions in an outward direction towards the cable release opening of the drum device, and prevent backward movement of the released cable into the drum device.

19. The drum device of claim 18 wherein the cable-release system comprises a first cable-release unit mounted above the circular wheel and having a slender opening defined between two rotatable roller shafts thereof for passage of the released cable portions therethrough.

20. The drum device of claim 19 wherein the cable-release system comprises at least one additional cable-release unit having a slender opening defined between two rotatable roller shafts for passage of the released cable portions therethrough, said at least one additional cable-release unit being mounted above and substantially in parallel to the first cable-release unit.

* * * * *